(12) United States Patent
Hannig

(10) Patent No.: US 10,189,300 B2
(45) Date of Patent: Jan. 29, 2019

(54) DECORATIVE WPC PANEL COMPRISING A LOW-POROUS PROFILED EDGE AND METHOD FOR PRODUCING THE SAME

(71) Applicant: AKZENTA PANEELE + PROFILE GMBH, Kaisersesch (DE)

(72) Inventor: Hans-Jurgen Hannig, Bergisch Gladbach (DE)

(73) Assignee: AKZENTA PANEELE + PROFILE GMBH, Kaisersesch (DE)

( * ) Notice: Subject to any disclaimer, the term of this patent is extended or adjusted under 35 U.S.C. 154(b) by 0 days.

(21) Appl. No.: 15/807,986

(22) Filed: Nov. 9, 2017

(65) Prior Publication Data

US 2018/0065405 A1 Mar. 8, 2018

Related U.S. Application Data

(63) Continuation of application No. 14/669,357, filed on Mar. 26, 2015, now abandoned.

(30) Foreign Application Priority Data

Apr. 9, 2014 (EP) ..................................... 14164042

(51) Int. Cl.
*B44F 9/04* (2006.01)
*B23B 41/00* (2006.01)
(Continued)

(52) U.S. Cl.
CPC .................. *B44F 9/04* (2013.01); *B05D 1/28* (2013.01); *B05D 3/12* (2013.01); *B23B 41/00* (2013.01); *B44C 5/04* (2013.01); *B44C 5/06* (2013.01); *B44F 9/02* (2013.01); *E04C 2/16* (2013.01); *E04C 2/22* (2013.01); *E04F 15/102* (2013.01); *B29C 2793/00* (2013.01); *B29C 2795/00* (2013.01); *B29D 2009/00* (2013.01); *E04C 2002/004* (2013.01); *E04C 2002/008* (2013.01)

(58) Field of Classification Search
CPC ...................................................... E04F 15/105
See application file for complete search history.

(56) References Cited

U.S. PATENT DOCUMENTS 3,486,957 A 12/1969 Cooper et al.
3,524,783 A 8/1970 Sutherland
(Continued)

FOREIGN PATENT DOCUMENTS

CN 2589578 Y 12/2003
CN 203393973 U 1/2014
(Continued)

OTHER PUBLICATIONS

English Language Abstract of CN203393973U, Jan. 15, 2014.
English Language Abstract of CN2589578Y, Dec. 13, 2003.

*Primary Examiner* — Sean Michalski
(74) *Attorney, Agent, or Firm* — Stinson Leonard Street LLP

(57) ABSTRACT

A decorative panel comprising a plate-shaped carrier made of a wood plastic composite (WPC) material, wherein the plate-shaped carrier comprises a profile and/or a cut edge in at least one edge region, and wherein the profile and/or the cut edge has a substantially sealed surface. A method for producing such panel including a step of subjecting a surface of a profile and/or cut edge to a thermal treatment to at least partially melt the WPC material in the region of the profile and seal the surface.

20 Claims, 1 Drawing Sheet

(51) Int. Cl.
*B44C 5/04* (2006.01)
*B05D 1/28* (2006.01)
*B05D 3/12* (2006.01)
*B44C 5/06* (2006.01)
*B44F 9/02* (2006.01)
*E04C 2/16* (2006.01)
*E04C 2/22* (2006.01)
*E04F 15/10* (2006.01)
*E04C 2/00* (2006.01)

(56) References Cited

U.S. PATENT DOCUMENTS

| | | |
|---|---|---|
| 3,754,489 A | 8/1973 | Carver, Jr. et al. |
| 3,931,383 A | 1/1976 | Erlewine et al. |
| 3,963,548 A | 6/1976 | George et al. |
| 4,064,776 A | 12/1977 | Walitalo et al. |
| 4,069,727 A | 1/1978 | Sparks et al. |
| 4,110,138 A | 8/1978 | Nomura et al. |
| 4,158,762 A | 6/1979 | Saunders |
| 4,206,668 A | 6/1980 | Creech |
| 4,242,074 A | 12/1980 | Lake |
| 4,525,396 A | 6/1985 | Takasa et al. |
| 4,599,134 A | 7/1986 | Babu et al. |
| 4,653,362 A | 3/1987 | Gerber |
| 4,840,009 A | 6/1989 | Rentmeester et al. |
| 5,005,336 A | 4/1991 | Bloom |
| 5,082,605 A | 1/1992 | Brooks et al. |
| 5,236,020 A | 8/1993 | Sakatani et al. |
| 5,405,705 A | 4/1995 | Fujimoto et al. |
| 5,585,155 A | 12/1996 | Heikkila et al. |
| 5,626,939 A | 5/1997 | Kotlair et al. |
| 5,866,264 A | 2/1999 | Zehner et al. |
| 5,948,187 A | 9/1999 | Pepi Vallone et al. |
| 6,164,177 A | 12/2000 | Galan et al. |
| 6,533,474 B1 | 3/2003 | Hart et al. |
| 6,590,014 B2 | 7/2003 | Ruede |
| 2004/0000120 A1 | 1/2004 | Fagan et al. |
| 2008/0113175 A1 | 5/2008 | Ke |
| 2010/0257805 A1 | 10/2010 | Di Lorenzo |
| 2011/0262720 A1 | 10/2011 | Riebel et al. |
| 2013/0190916 A1 | 7/2013 | Schnaufer et al. |
| 2013/0263530 A1 | 10/2013 | Shiao et al. |
| 2014/0198168 A1 | 7/2014 | Pervan et al. |
| 2014/0349074 A1 | 11/2014 | Birchmeier et al. |
| 2016/0089849 A1 | 3/2016 | Kayanoki et al. |

FOREIGN PATENT DOCUMENTS

| | | |
|---|---|---|
| EP | 2264259 A2 | 12/2010 |
| EP | 2708374 A1 | 3/2014 |

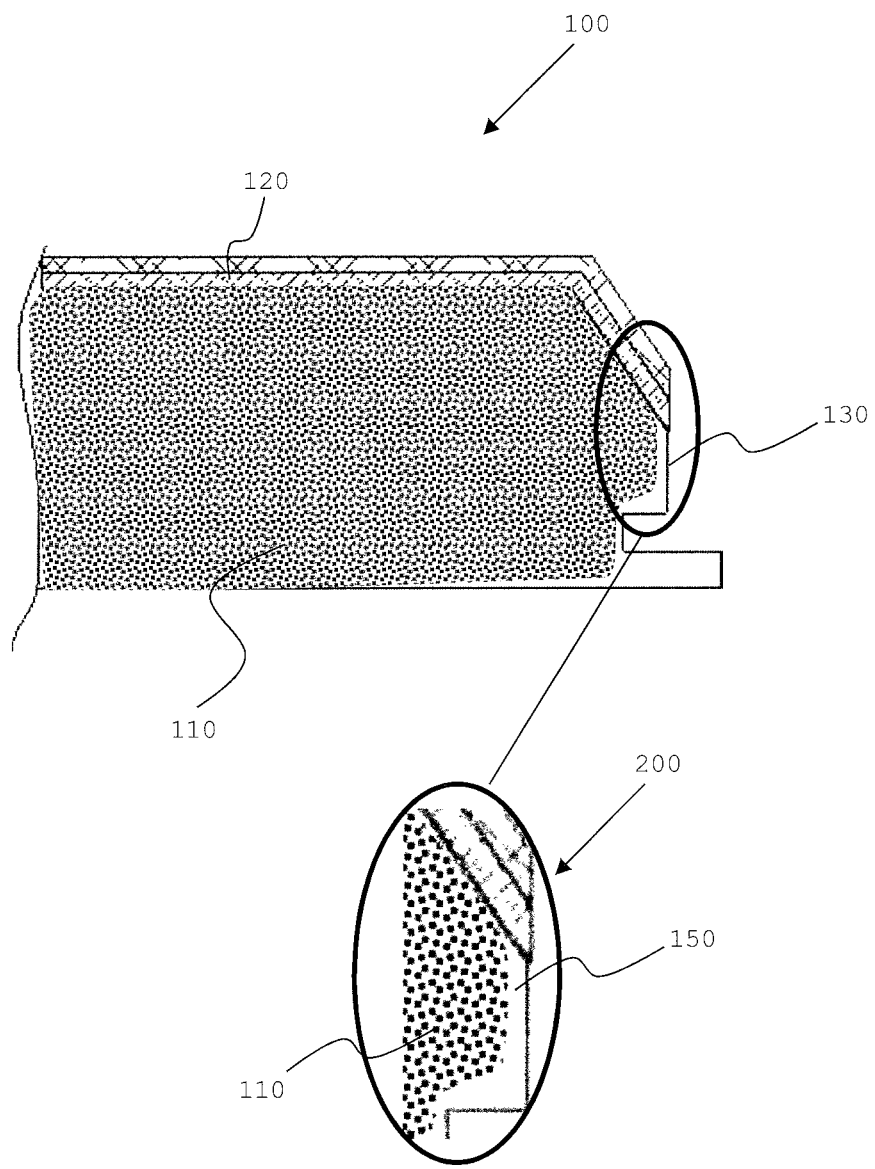

DECORATIVE WPC PANEL COMPRISING A LOW-POROUS PROFILED EDGE AND METHOD FOR PRODUCING THE SAME

REFERENCE TO RELATED APPLICATIONS

This application is a continuation of U.S. application Ser. No. 14/669,357, filed Mar. 26, 2015, which claims priority to European application EP 14 164 042.5, filed Apr. 9, 2014, the entire disclosures of which are incorporated by reference.

FIELD OF THE INVENTION

The present invention relates to a decorative WPC panel comprising a low-porous profiled edge and a method for producing in particular direct printed decorative panels comprising a low-porous profiled edge.

BACKGROUND OF THE INVENTION

Decorative plates or decorative panels are known per se and used in a variety of ways for covering walls, ceilings or floors. They normally consist of a carrier or core of a solid material, for example a wood-based material, which is provided on at least one side with a decorative layer and a top layer and optionally with further layers, such as a wearing layer. The decorative layer is usually a printed paper which is impregnated with a resin. The top layer and the remaining layers often comprise a resin.

The carrier of such a decorative panel consists usually of wood or a wood-based material such as a MDF or HDF board or an OSB board, onto which an appropriate decoration, e.g. by applying a decorative sheet of paper, and usually further top layers are applied. Despite of this laminate structure there is a risk for decorative panels based on corresponding carriers made of wood-based materials that these will swell when exposed to moisture resulting in a damage of the panels.

The risk of swelling due to moisture is reduced significantly with the use of alternative materials as carriers, such as plastic or wood polymer composite (WPC wood-plastic-composite). WPC is a mixture of wood particles and plastic, which are mixed by a suitable production process into a homogeneous composite material having plastic-like processing properties.

In processing plate-shaped carriers on the basis of a WPC the plate-shaped carriers are usually processed as large format plates, which are divided in the course of the processing into a plurality of panels of a desired size. Then in addition the panels are generally provided with a functional profiling such as a tongue and groove profile or a locking profile at at least one edge by means of which the panels can be connected during the assembly in order to provide a contiguous surface.

Herein, one disadvantage in cutting or profiling of the plate-shaped carriers is that at the cutting surfaces wood fibers of the WPC material may be exposed, which may swell when exposed to moisture and thus can lead to a damage of the panel.

SUMMARY OF THE INVENTION

It is therefore an object of the present invention to provide a decorative WPC panel improved in this respect and a method for producing such a decorative WPC panel.

This object is achieved by a decorative panel comprising a plate-shaped carrier made of a wood plastic composite (WPC) material, wherein the plate-shaped carrier in at least one edge region has a profile and/or a cut edge, and wherein the profile and/or cut edge comprises a substantially sealed surface.

In another aspect, the object is achieved by a method for producing a decorative panel, comprising the steps of forming a profile and/or a cut edge in at least one edge of the plate-shaped carrier made from a WPC material, and subjecting a surface of the introduced profile and/or cut edge to a thermal treatment to at least partially melt the WPC material in the region of the profile and the surface is sealed.

BRIEF DESCRIPTION OF THE FIGURES

FIG. 1 is a schematic illustration of a panel of the invention.

DETAILED DESCRIPTION OF PREFERRED EMBODIMENTS

The invention thus proposes a decorative panel comprising a plate-shaped carrier made of a wood plastic composite (WPC) material, wherein the plate-shaped carrier has in at least one edge region a profile and/or a cut edge, characterized in that the profile and/or the cut edge has a substantially sealed surface. FIG. 1 shows the decorative panel 100 comprising the plate-shaped carrier 110 made of the WPC material. Decor 120 is applied to the carrier. In at least one edge region 130 the plate-shaped carrier has a profile and/or a cut edge. The profile and/or cut edge comprises a substantially sealed surface 150, as shown at detail 200.

A sealed surface in the sense of the invention is a surface which essentially comprises no open wood fibers at the direct surface, rather the surface substantially consists of a closed layer of plastic. This does not preclude that wood fibers are disposed on the surface, but they are surrounded by plastic in such a way that moisture cannot penetrate into the wood fibers.

The term "decorated wall or floor panel" or "decorative panel" in the sense of the invention means in particular wall, ceiling or floor panels comprising a decor simulating a decoration template applied onto a carrier plate. Decorative panels are used in a variety of ways both in the field of interior design of rooms and for decorative cladding of buildings, for example in exhibition stand construction. One of the most common uses of decorative panels is their use as a floor covering. Here, the decorative panels often comprise a decor intended to replicate a natural material.

Examples of such replicated natural materials or decoration templates are wood species such as maple, oak, birch, cherry, ash, walnut, chestnut, wenge or even exotic woods such as Panga Panga, mahogany, bamboo and bubinga. In addition, often natural materials such as stone surfaces or ceramic surfaces are replicated.

Accordingly, a "decoration template" in the sense of the present invention in particular means such an original natural material or at least a surface of such a material which is to be imitated or replicated by the decor.

A "pourable" material in particular means a material which can be applied onto a base by a pouring or scattering process. Herein, the material may be provided as a fluid or in particular as a pourable solid.

A "granulate material" or "granular material" means a solid or a head of a solid comprising or consisting of a plurality of solid particles, such as grains or beads. Here by way of example but not limited thereto grainy or powdery materials can be mentioned.

A "carrier" in particular can be understood as a layer serving as a core or as a base layer in a finished panel, which in particular includes a material comprising a plastic and wood fibers and/or wood particles. For example, the carrier can already provide or contribute to a suitable stability for the panel.

Herein, a "web-like carrier" can be understood as a carrier which, for example, during its manufacturing process has a web-like shape and thus a length which is substantially greater than its thickness or width, wherein its length may be greater than 15 meters.

Herein, the term "plate-shaped carrier" in the sense of the present invention can be understood as a carrier which is formed by separation from the web-like carrier and is formed in the shape of a plate. The plate-shaped carrier can already define the shape and/or size of the panel to be produced. However, the plate-shaped carrier can also be provided as a large plate. A large plate in the sense of the invention in particular is a carrier whose dimensions several times exceed the dimensions of the final decorative panels, and which is cut during the course of the manufacturing process into a corresponding plurality of decorative panels, for example by sawing, laser or water jet cutting. For example, the large plate may correspond to the web-like carrier.

Wood-based materials in the sense of the invention in particular are wood-based materials such as wood polymer materials (Wood Plastic Composite, WPC).

In the sense of the invention the term "fiber materials" means materials such as paper and non-woven fabrics on the basis of plant, animal, mineral or even synthetic fibers as well as cardboards. Examples are fiber materials on the basis of plant fibers and in addition to papers and non-woven fabrics made of cellulose fibers boards made of biomass such as straw, maize straw, bamboo, leaves, algae extracts, hemp, cotton or oil palm fibers. Examples of animal fiber materials are keratin-based materials such as wool or horsehair. Examples of mineral fiber materials are mineral wool or glass wool.

According to one embodiment a carrier material based on a plastic or a wood plastic composite material (WPC) can be provided. For example, the carrier plate can be formed from a thermoplastic, elastomeric or duroplastic plastic material. In addition, recycling materials from said materials can be used in the context of the method according to the invention. Herein, preferred plate materials may be in particular thermoplastic plastic materials, such as polyvinyl chloride, polyolefins (for example polyethylene (PE), polypropylene (PP), polyamide (PA)), polyurethane (PU), polystyrene (PS), acrylonitrile-butadiene-styrene (ABS), polymethyl methacrylate (PMMA), polycarbonate (PC), polyethylene terephthalate (PET), polyether ether ketone (PEEK) or mixtures or copolymerizates thereof. Herein, irrespective of the base material of the carrier, for example, plasticizers may be provided which may be present in a range of $\geq 0$ wt.-% to $\leq 20$ wt.-%, in particular $\leq 10$ wt.-%, preferably $\leq 7$ wt.-%, for example in a range of $\geq 5$ wt.-% to $\leq 10$ wt.-%. A suitable plasticizer, for example, is a plasticizer available under the trade name "Dinsch" from BASF company. Moreover, as a substitute for conventional plasticizers copolymers such as acrylates or methacrylates can be used.

In particular thermoplastic plastic materials offer the advantage that the products made from them can easily be recycled. It is also possible to use recycling materials from other sources. This enables a further reduction of the manufacturing costs.

Such carriers are very elastic or springy, which allows a comfortable feeling when walking on them and also a suppression of noises occurring during walking on them compared to conventional materials, thus, an improved impact sound can be realized.

In addition, the abovementioned carriers offer the advantage of a good water resistance, because they have a degree of swelling of 1% or less. This in a surprising way besides pure plastic carriers also applies to WPC materials, as will be explained in detail below.

In a particularly advantageous manner the carrier material can comprise or consist of wood polymer materials (Wood Plastic Composite, WPC). Here, as an example wood and a polymer may be suitable, which can be present in a ratio of 40/60 to 70/30, such as 50/50. As polymeric components polypropylene, polyethylene or a copolymer of the two abovementioned materials can be used. Such materials offer the advantage that they can be formed into a carrier in the above-described process already at low temperatures, such as in a range of $\geq 180°$ C. to $\leq 200°$ C., so that a particularly effective process control, such as with exemplary line speeds in a range of 6 m/min, is possible. For example, a WPC product with a 50/50 proportion of wood and polymer components with an exemplary product thickness of 4.1 mm is possible, which may allow for a particularly effective manufacturing process.

In addition, in this way very stable panels can be produced, which moreover have a high elasticity, which in particular can be advantageous for an effective and cost-efficient configuration of connecting elements at the edge region of the carrier and further with respect to an impact sound insulation. Furthermore, the above-mentioned good water tolerance with a degree of swelling of less than 1% can be achieved with such WPC materials. Herein, WPC materials can include, for example, stabilizers and/or other additives which preferably may be present in the plastic portion.

Furthermore, it may be particularly advantageous that the carrier material comprises or consists of a PVC-based material. Even such materials can be used in a particularly advantageous manner for high quality panels that can easily be used even in wet rooms. Furthermore, also PVC-based carrier materials may be useful for a particularly effective manufacturing process, since here line speeds of 8 m/min for an exemplary product thickness of 4.1 mm may be possible, which could allow for a particularly effective manufacturing process. Moreover, also such carriers have an advantageous elasticity and water tolerance, which can lead to the above-mentioned advantages.

Herein, in plastic-based panels as well as in WPC-based panels mineral fillers may be advantageous. Particularly suitable are talc or calcium carbonate (chalk), aluminum oxide, silicagel, quartz powder, wood flour and gypsum. For example, chalk may be provided in a range of $\geq 30$ wt.-% to $\leq 70$ wt.-%, wherein the fillers, in particular chalk can improve the slip of the carrier. They also can be colored in a known manner. In particular, it can be provided that the plate material comprises a flame retardant.

According to a particularly preferred embodiment of the invention the carrier material consists of a mixture of a PE/PP block copolymer with wood. Herein, the proportion of the PE/PP block copolymer and the proportion of wood can range between $\geq 45$ wt.-% and $\leq 55$ wt.-%. Furthermore, the carrier material can comprise between $\geq 0$ wt.-% and $\leq 10$ wt.-% of other additives such as flow agents, heat stabilizers or UV stabilizers. Here, the particle size of the wood is between ≥0 µm and ≤600 µm with a preferred particle size distribution of $D_{50} \geq 400$ µm. In particular, the carrier material may comprise wood with a particle size distribution of $D_{10} \geq 400$ µm. The particle size distribution is based on the volumetric diameter and refers to the volume of the particles. Particularly preferably the carrier material is provided as granular or pelletized pre-extruded mixture of a PE/PP block copolymer with wood particles with the specified particle size distribution. Here, the granules and/or pellets can preferably have a particle size in the range of ≥400 µm to ≤10 mm, preferably ≥600 µm to ≤10 mm, in particular ≥800 µm to ≤10 mm.

According to a further preferred embodiment of the invention the carrier material consists of a mixture of a PE/PP polymer blend with wood. Here, the proportion of PE/PP polymer blend as well as the proportion of wood can range between ≥45 wt.-% and ≤55 wt.-%. Furthermore, the carrier material can comprise between ≥0 wt. % and ≤10 wt.-% of other additives such as flow agents, heat stabilizers or UV stabilizers. Here, the particle size of the wood is between ≥0 µm and ≤600 µm with a preferred particle size distribution of $D_{50} \geq 400$ µm. In particular, the carrier material may comprise wood with a particle size distribution of $D_{10} \geq 400$ µm. The particle size distribution is based on the volumetric diameter and refers to the volume of the particles. Particularly preferably, the carrier material is provided as a granular or pelletized pre-extruded mixture of a PE/PP polymer blend with wood particles with the specified particle size distribution. Here, the granules and/or pellets can preferably have a particle size in the range of ≥400 µm to ≤10 mm, preferably ≥600 µm to ≤10 mm, in particular ≥800 µm to ≤10 mm.

In a further embodiment of the invention, the carrier material consists of a mixture of a PP homopolymer with wood. The proportion of the PP homopolymer and the proportion of wood can range between ≥45 wt.-% and ≤55 wt.-%. Furthermore, the carrier material can comprise between ≥0 wt.-% and ≤10 wt.-% of other additives, such as flow agents, heat stabilizers or UV stabilizers. Here, the particle size of the wood is between ≥0 µm and ≤600 µm with a preferred particle size distribution of $D_{50} \geq 400$ µm. In particular, the carrier material can comprise wood with a particle size distribution of $D_{10} \geq 400$ µm. The particle size distribution is based on the volumetric diameter and refers to the volume of the particles. Particularly preferably the carrier material is provided as a granular or pelletized pre-extruded mixture of a PP homopolymer with wood particles of the specified particle size distribution. The granules and/or pellets can preferably have a particle size in the range of ≥400 µm to ≤10 mm, preferably ≥600 µm to ≤10 mm, in particular ≥800 µm to ≤10 mm.

In another embodiment of the invention, the carrier material consists of a mixture of a PVC polymer with chalk. Herein, the proportion of the PVC polymer and the proportion of chalk can range between ≥45 wt.-% and ≤55 wt.-%. Furthermore, the carrier material can comprise between ≥0 wt.-% and ≤10 wt.-% of other additives, such as flow agents, heat stabilizers or UV stabilizers. The particle size of the chalk is between ≥0 µm and ≤600 µm with a preferred particle size distribution of $D_{50} \geq 400$ µm. In particular, the carrier material may comprise chalk with a particle size distribution of $D_{10} \geq 400$ µm. The particle size distribution is based on the volumetric diameter and refers to the volume of the particles. Particularly preferably the carrier material is provided as a granular or pelletized pre-extruded mixture of a PVC polymer with chalk with the specified particle size distribution. The granules and/or pellets can preferably have a particle size in the range of ≥400 µm to ≤10 mm, preferably ≥600 µm to ≤10 mm, in particular ≥800 µm to ≤10 mm.

In a further embodiment of the invention the carrier material consists of a mixture of PVC polymer with wood. Herein, the proportion of the PVC polymer and the proportion of the wood can range between ≥45 wt.-% and ≤55 wt.-%. Furthermore, the carrier material can comprise between ≥0 wt.-% and ≤10 wt.-% of other additives, such as flow agents, heat stabilizers or UV stabilizers. The particle size of the wood is between ≥0 µm and ≤600 µm with a preferred particle size distribution of $D_{50} \geq 400$ µm. In particular, the carrier material can comprise wood with a particle size distribution of $D_{10} \geq 400$ µm. The particle size distribution is based on the volumetric diameter and refers to the volume of the particles. Particularly preferably the carrier material is provided as granular or pelletized pre-extruded mixture of a PVC polymer with wood particles of the specified particle size distribution. The granules and/or pellets can preferably have a particle size in the range of ≥400 µm to ≤10 mm, preferably ≥600 µm to ≤10 mm, in particular ≥800 µm to ≤10 mm.

For determining the particle size distribution well-known methods such as laser diffractometry can be used, by means of which particle sizes in the range from a few nanometers up to several millimeters can be determined. Using this method also $D_{50}$ or $D_{10}$ values can be determined, according to which 50% and 10%, respectively, of the measured particles are smaller than the specified value.

According to another embodiment the carrier material may comprise hollow microspheres. This kind of additives can in particular cause that the density of the carrier and thus of the produced panel can be significantly reduced, such that a particularly simple and cost-effective transportation and also a very comfortable laying can be guaranteed. Herein, in particular by the insertion of hollow microspheres a stability of the produced panel can be ensured which is not significantly reduced compared to a material without hollow microspheres. Thus, the stability is sufficient for most applications. Herein, hollow microspheres can be understood in particular as structures, which have a hollow basis body and a size or a maximum diameter in the micrometer range. For example, usable hollow spheres may have a diameter in the range of ≥5 µm to ≤100 µm, such as ≥20 µm to ≤50 µm. As a material of the hollow microspheres basically any material comes into consideration, such as glass or ceramic. Further, due to the weight plastics, such as the plastics used in the carrier material, such as PVC, PE or PP can be advantageous, wherein these optionally can be prevented from deforming during the manufacturing process by suitable additives.

According to a further embodiment of the invention the decorative panel comprises a decor which is applied onto the plate-shaped carrier by means of direct printing. Here, in the sense of the invention the term "direct printing" means applying a decor directly onto the carrier of a panel or onto an unprinted fiber material layer or decor base applied onto the carrier. To this end different printing techniques such as flexographic printing, offset printing or screen printing can be used. In particular, as digital printing techniques, for example, inkjet or laser printing processes can be used.

For example, in order to imitate or replicate a decoration template in a particularly detailed and highly accurate manner in a three-dimensional form, the decor can be applied identically to the template. In particular, the three-dimensional decor data can be provided by three-dimensionally scanning the decoration template by means of electromagnetic radiation such as by a three-dimensional scanner (3D scanner). Herein, a plurality of decor layers with at least partially different surface application amounts can successively be applied on the basis of provided three-dimensional decor data.

Moreover, the decorative layers may be formed of a particularly radiation curable paint and/or ink. For example, a UV-curable paint or ink can be used. In this embodiment a particular detailed and matching replica of the decoration template can be obtained. On the one side a highly accurate synchronous pore can be achieved in this way without providing further measures. Herein, a synchronous pore can in particular be a pore or another structure, which is spatially located exactly there where it is displayed visually by a haptic texture matching with the optical decor features. In this embodiment this is essentially automatically the case, because the structural design is created by the paint or ink. In addition, decoration templates, such as wood-based materials, often comprise a variation of the color impression not only along their width or length but also along their depth. Even this color impression or color gradient can be simulated particularly detailed in this embodiment, such that the overall appearance of the panel looks even more identical. Herein, a particularly rapid solidification can be achieved especially when the paint or ink used is radiation curable, whereby the plurality of layers may be applied rapidly in succession, such that the entire process can be realized within a reduced time and thus is particularly cost-efficient.

The term radiation curable paint in the sense of the invention means a composition which includes a binder and/or a filler as well as color pigments and which induced by electromagnetic radiation of a suitable wavelength, such as UV radiation or electron beams, can be at least partially polymerized.

The term radiation curable ink in the sense of the invention means a composition essentially free of fillers and comprising color pigments, which induced by electromagnetic radiation of a suitable wavelength, such as UV radiation or electron beams, can be at least partially polymerized.

Herein, the decorative layers each can be applied in a thickness in the range of $\geq 5$ µm to $\geq 10$ µm.

In addition to a positive image with respect to the color and/or texture it can also be provided to apply a corresponding negative image of the decoration template. In detail, as is known, for example, from positive staining or negative staining of wood-based materials, by the use of digital data the color impression e.g. of a texture can be inverted, so that with respect to the color and in particular with respect to lighter and darker areas a negative is created. A similar effect, in addition to the color impression, is possible for the applied texture, too, such that also with respect to the structural design a negative can be realized. Such effects, too, can be integrated into a manufacturing process based on digital three-dimensional data without any problems and without lead-time or retrofitting.

The invention is also directed to a method for producing a decorative panel comprising the steps of providing a plate-shaped carrier of a WPC material; and introducing a profile and/or a cut edge at at least one edge of the plate-shaped carrier, which is characterized in that the surfaces of the introduced profile and/or cut edge are subjected to a thermal treatment in which the WPC material is at least partially molten in the region of the profile and the surface is sealed.

Surprisingly, it has been shown that the wood fibers and/or particles exposed by processing the decorative panel or the carrier plate can be sealed by a thermal treatment which effects a melting of the surface such that the swelling behavior with respect to the impact by moisture can be reduced significantly. Thus, swelling of the profiled edges and/or cutting surfaces and the concomitant damage of the decorative panel in the case of impact by moisture can be avoided.

Herein, the WPC material is merely molten near-surface. Near-surface means in the sense of the invention up to a depth of $\leq 3$ mm, preferably $\leq 2$ mm, more preferably $\leq 1$ mm and in particular $\leq 0.8$ mm.

According to one embodiment of the method it is provided that after profiling or sawing the decorative panels or the plate-shaped carrier melting of the WPC material in the near-surface region is implemented in a process step downstream of the profiling and/or sawing process. To this end, for example, the use of a temperature controlled melting head may be provided which with respect to its profile corresponds to the profile or cut introduced in the edge and is guided over the surfaces of the profile or cutting surfaces, wherein the WPC material melts near-surface.

In one embodiment of the invention the melting head is preferably maximally heated up to a temperature $\leq 30°$ C. above the melting temperature of the WPC material.

According to a further embodiment of the invention, the introduction of the profile and/or the cut edge is implemented by means of a cutting or machining process such as by milling or sawing. Herein, according to another embodiment of the invention it can be particularly provided that the melting of the WPC material is implemented by heating the cutting tool used for profiling and/or cutting of the at least one edge of the plate-shaped carrier by machining to a temperature greater than or equal to the melting temperature and lower than the decomposition temperature of the WPC material. As a result, an additional process step can be avoided.

In one embodiment of the invention it may be provided that the cutting tool is maximally temperature controlled to a temperature $\leq 30°$ C. above the melting temperature of the WPC material. Herein, it can be provided that the temperature control of the cutting or machining tool is implemented by a heating and/or cooling device.

Here, it can preferably be provided that the temperature of the cutting or machining tool is monitored contact-free, for example by means of an infrared temperature sensor or an infrared thermometer. Then the temperature control of the tool can preferably be carried out as a function of the data collected in the course this monitoring.

According to a particularly preferred embodiment of the invention at least a part of the temperature control of the cutting and/or machining tool is implemented by use of the heat produced by the cutting and/or machining process itself. This heat is caused by the friction between the tool and the material. Herein, in a particularly preferred embodiment of the invention it can be provided that the processing speed, in particular the rotation speed of the tool and the relative velocity between the decorative panel/carrier plate and the cutting or milling head is adjusted such that the heat of the tool generated during the machining process occurs in a temperature range greater than or equal to the melting temperature of the WPC material and lower than the decomposition temperature of the WPC material.

According to a further embodiment of the invention it can be provided that at least the profiled region of the edge of the plate-shaped carrier and/or the cutting surface is cooled down to a temperature below the melting temperature after melting of the WPC material and sealing the surface.

This cooling according to the invention, for example, can be carried out by an air flow directed onto the corresponding surface. Herein, it may in particular be provided that the air flow is cooled and thus has a temperature below the ambient temperature of the machining site.

Alternatively, a temperature controlled cooling head can be used which with respect to its profile corresponds to the profile or cut introduced into the edge and is guided over the surfaces of the profile or cutting surfaces, wherein the WPC material is cooled down to a temperature below the melting temperature of the WPC material.

According to a further embodiment of the invention it may be provided that the cooling of the WPC material molten near-surface is implemented within a period of ≤60 s, preferably ≤45 s, in particular ≤30 s. In this way it can be ensured that no subsequent unwanted deformation of the profile is caused.

To produce a finished panel the method may comprise further process steps to provide the carrier with a decor and to coat the decor with a protective layer. Herein, if appropriate, first a pretreatment of the carrier for electrostatic discharge or specific charge before applying a decorative image using a direct printing method can be implemented. This in particular can serve to prevent the occurrence of blurring in the course of the decor application. This is particularly suitable for printing processes for applying the decorative layers, because the electrostatic charge which builds up in the carriers to be printed in the course of the production process results in a deflection of paint or ink droplets on their way from the print head to the surface to be printed. The thus induced inaccuracy of the paint application leads to a perceivable blurring of the printed image.

Herein the means for discharging electrostatic charges may at least comprise a roller, a brush or a lip of a conductive material having a conductivity $\geq 1 \cdot 10^3$ Sm$^{-1}$, which electrically conductive contacts the carrier at least in the region of the printing mechanism and which is connected to an electrical ground potential. In this case, the electrical ground potential may be provided, for example, by a grounding. In addition, for example, a means for discharging electrostatic charges may be a means for producing a corona discharge.

Moreover, it can be provided that a decor base or print base is applied to at least a portion of the carrier. For example, first a primer particularly suited for printing processes can be applied as a decor base, for example in a thickness of ≥10 μm to ≤60 μm. Herein, as a primer a liquid radiation curable mixture based on a urethane or urethane acrylate, optionally with one or more of a photo initiator, a reactive diluent, a UV stabilizer, a rheological agent such as a thickener, radical scavengers, leveling agent, antifoam or preservative, pigment, and/or a dye can be used. For example, the urethane acrylate may be included in the primer composition in the form of reactive oligomers or prepolymers. The term "reactive oligomer" and "prepolymer" in the sense of the invention is a compound comprising urethane acrylate units which is able to react radiation-induced, optionally with addition of a reactive binder or a reactive diluent, into urethane polymer or urethane acrylate polymer. Herein, urethane acrylates in the sense of the invention are compounds which substantially are composed of one or more aliphatic structural elements and urethane groups. Aliphatic structural elements comprise both alkylene groups, preferably comprising 4 to 10 carbon (C) atoms and cycloalkylene groups preferably comprising 6 to 20 carbon atoms. Both the alkylene and the cycloalkylene groups may be mono- or polysubstituted with $C_1$-$C_4$ alkyl, in particular methyl and include one or more non-adjacent oxygen atoms. The aliphatic structural elements are optionally linked to each other via quaternary or tertiary carbon atoms, via urea groups, biuret, uretdione, allophanate, cyanurate, urethane, ester or amide groups or via ether oxygen or amine nitrogen. Furthermore, urethane acrylates in the sense of the invention can also include ethylenically unsaturated structural elements. These preferably include vinyl or allyl groups, which may be substituted with $C_1$-$C_4$ alkyl, in particular methyl and which, in particular, are derived from α,β-ethylenically unsaturated carboxylic acids and their amides. Particularly preferred ethylenically unsaturated structural units are acryloyl and methacryloyl groups such as acrylamido and methacrylamido and in particular acryloxy and methacryloxy. Radiation-curable in the sense of the invention means that the primer composition induced by electromagnetic radiation of a suitable wavelength, such as ultraviolet radiation or electron beams, can be at least partially polymerized.

The use of radiation-curable primers based on urethane acrylates allows in a particularly advantageous manner an application of the decor immediately subsequent to the application and the radiation-induced curing of the primer layer, for example, by means of a digital printing technique. Herein, the primer layer provides for a good adhesion of the applied decor onto the carrier surface coated with the primer. Herein, urethane acrylates offer the advantage of a good adhesion to both the carrier material and the decorative layer, i.e. the decor paint or ink. This inter alia resides in the polymerization reactions occurring in this type of polymers, in which on the one hand a radiation-induced radical polymerization of the OH groups occurs and on the other hand post-curing of the polymer via the NCO groups occurs. Thus, after the radiation-induced curing immediately a tack-free and further processable surface is obtained, while the final properties of the primer layer are also influenced by the post-curing process based on the NCO groups and provide for a secure bond to the carrier material. In addition, the occurring post-curing process ensures that a sufficient layer of stability is achieved even in less or non-exposed areas of the carrier. Thus, the method according to the invention enables in particular also pre-textured carriers, i.e. carriers whose surface already have a three-dimensional structure, to be provided with a primer layer, thereby ensuring that the subsequently applied decor firmly adheres to the carrier.

In the method according to the invention the primer can be preferably applied onto the carrier plate by means of rubber rollers, a pouring device, or by spraying. Preferably the primer is applied in an amount between $\geq 1$ g/m$^2$ and $\leq 100$ g/m$^2$, more preferably between $\geq 10$ g/m$^2$ and $\leq 50$ g/m$^2$, in particular between $\geq 20$ g/m$^2$ and $\leq 40$ g/m$^2$. Subsequently to the application of the primer onto the carrier surface an irradiation process by means of a radiation source of an appropriate wavelength is carried out.

In addition to the use of a primer it is possible to apply the decor onto a decorative paper printable with the corresponding decor, which may be provided by means of a resin layer as a bonding agent previously applied onto the carrier. Such a printing base is suitable for flexographic printing, offset printing or screen printing as well as in particular for digital printing techniques such as inkjet processes or laser printing. For the application of the resin layer it may be preferably provided that a resin composition is applied, which as a resin component at least comprises one compound selected from the group consisting of melamine resin, formaldehyde resin, urea resin, phenol resin, epoxy resin, unsaturated polyester resin, diallyl phthalate or mixtures thereof. Herein, the resin composition can, for example, be applied in an area density between ≥5 g/m² and ≤40 g/m², preferably ≥10 g/m² and ≤30 g/m². Further, a paper or a non-woven fabric with a grammage between ≥30 g/m² and ≤80 g/m², preferably between ≥40 g/m² and ≤70 g/m², can be applied onto the plate-shaped carrier.

Moreover according to the invention a protective layer can be applied on at least a portion of the decor. Such a layer for protecting the applied decor can in particular be applied in a subsequent process step as a wearing or top layer on top of the decorative layer, and in particular protects the decorative layer against wear or damage caused by dirt, moisture or mechanical impacts, such as abrasion. For example, it may be provided that the wearing and/or top layer is laid onto the printed carrier as a prefabricated overlay layer, such as based on melamine, and is bonded thereto by means of pressure and/or heat. Moreover, it may be preferred that for the formation of the wearing and/or top layer, too, a radiation curable composition, for example a radiation curable varnish such as an acrylic varnish, is applied. Herein, it may be provided that the wearing layer includes hard materials such as titanium nitride, titanium carbide, silicon nitride, silicon carbide, boron carbide, tungsten carbide, tantalum carbide, alumina (corundum), zirconia or mixtures thereof, in order to increase the wear resistance of the layer. Herein, the coating can be applied, for example, by means of rollers such as rubber rollers or by means of pouring devices.

Furthermore, the top layer can initially be partially cured and subsequently a final coating with a urethane acrylate and a final curing step e.g. by use of a gallium emitter can be conducted.

Moreover, the top and/or wearing layer can comprise means for reducing the static (electrostatic) charging of the finished laminate. For example, it may be provided that the top and/or wearing layer to this end comprises compounds such as choline chloride. Herein, the antistatic agent may, for example, be included in the composition for forming the top and/or wearing layer at a concentration between ≥0.1 wt.-% and ≤40.0 wt.-%, preferably between ≥1.0 wt.-% and ≤30.0 wt.-%.

Moreover, it can be provided that in the protective layer or in the wearing or top layer a texture, in particular a surface texture matching with the decor is produced by introducing pores. Herein, it may be provided that the carrier plate already has a texture and an alignment of a printing tool for applying the decor with respect to the carrier plate is implemented depending on the texture of the carrier plate which is detected by means of optical methods. Herein, for aligning the printing tool and the carrier plate relative to each other it can be provided that a relative movement between the printing tool and the carrier plate necessary for the alignment is implemented by shifting the carrier plate or by shifting the printing tool. Moreover, it can be provided that a texturing of the decorative panel is implemented subsequently to the application of the top and/or wearing layer. To this end it may be preferred to apply a settable composition as the top and/or wearing layer and a curing process is done solely to the extent that only a partial curing of the top and/or wearing layer is achieved. In the thus partially cured layer by means of appropriate tools, such as a hard metal texture roller or a die, a desired surface texture is embossed. Herein, the embossing process is implemented in correspondence with the applied decor. In order to ensure a sufficient correspondence of the texture to be produced with the decor it may be provided that the carrier plate and the embossing tool are aligned relative to each other by corresponding relative movements. Subsequently to the production of the desired texture within the partially cured top and/or wearing layer a further curing step is implemented with respect to the now textured top and/or wearing layer.

In many cases it is provided that a surface texture matching with the decor is introduced within such a wearing and/or top layer. A surface texture matching with the decor means that the surface of the decorative panel has a haptically perceptual structure, which according to its shape and pattern corresponds to the applied decor in order to achieve a reproduction of a natural material as close to the original as possible even with respect to the haptic.

In addition, on the side opposite to the decor side a counteracting means may be applied. Herein, it is particularly preferred that the counteracting means is applied in a common calendering step with the paper or non-woven fabric on the decor side.

By partially profiling the decorative panel not all profiles to be provided in the finished panel are produced, but only a part of the profiles, while other profiles are produced in a subsequent step. Thus, it may be provided, for example, that the decorative profile to be provided in a panel, such as a chamfer, is produced in one step, while the functional profile, e.g. groove/tongue, is produced in a subsequent step.

By means of the application of the decor subsequently to the at least partially profiling of the carrier, for example, by means of the above-described methods, such as direct printing, abrasion or damage of the decor in the course of the profiling process is avoided in an advantageous way. Thus, the decor also in the regions of the profile corresponds in detail the desired imitation, for example, of a natural material.

In order to provide a particular detailed imitation even in the profiled regions the master used for the printing process can be distortion corrected in the region of the profile of the panel. Distortion correction in the sense of the invention means, for example, with respect to the exemplary case of application by means of a printing process, that the distortion of the printed image caused by the deviation of the profiling out of the surface plane of the carrier, for example, at a chamfer edge, is corrected by matching the master with the deviation. Herein, it may be provided, for example, that the correction of the distortion is implemented by matching the pixel spacing, the pixel size and/or the ink application depending on the intended edge profile of the finished decorative panel. Herein, in case of printing by means of digital printing the print head can be driven depending on the distortion to be corrected, such that the print head, for example, is deflected beyond the profiled region and the ink discharge is adapted to the profile.

Here, it is e.g. possible that prior to the application of the decorative layer of the carrier provided as a large plate, the joints (such as V-joints) to be provided in the final panel laminate, are milled into the carrier, on the thus profiled carrier at least the decorative layer is applied and subsequently the carrier is cut and separated at least in the profiled areas. Herein, depending on the cutting method, such as sawing, laser or water jet cutting, it may be preferred that the required bleed allowance is taken into account in the produced profile.

For example, the plate-shaped carrier can comprise a material which is based on a WPC material or a PVC material. With respect to the exact composition and the advantages resulting therefrom we explicitly refer to the above description of the method.

According to another embodiment, it may be provided that the decorative panel is profiled at least in an edge region of the carrier plate. Here, it may be in particular provided that the decor is applied also in the region of the profiling, such that the profiling can be implemented prior to the application of the decorative layer onto the plate-shaped carrier. Alternatively or in addition a profiling can be implemented subsequently to the application of the decorative layer. In profiling in the sense of the invention it is provided that by means of suitable machining tools at least in a portion of the edges of the decorative panel a decorative and/or functional profile is introduced. Here, a functional profile, for example, means the introduction of a groove and/or tongue profile in an edge in order to make decorative panels connectable to each other by means of the introduced profiles. A decorative profile in the sense of the invention, for example, is a chamfer formed at the edge region of the decorative panel, for example, in order to simulate a joint between two interconnected panels, such as for example in so-called wide planks.

The invention claimed is:

1. A method for producing a decorative panel, comprising the steps of: providing a plate-shaped carrier made of a WPC (wood plastic composite) material comprising wood particles and plastic;
forming a profile in at least one edge of the plate-shaped carrier by milling using a milling head;
subjecting a surface of the profile to a thermal treatment to at least partially melt the WPC material in the region of the profile and seal the surface.

2. The method according to claim 1, wherein the profile is a functional profile in the shape of a tongue or groove for connecting panels together.

3. The method according to claim 2, wherein the melting of the WPC material is implemented by heating the milling head used in the process for the profiling of the at least one edge of the plate-shaped carrier to a temperature greater than or equal to a melting temperature of the WPC material and less than a decomposition temperature of the WPC material.

4. The method according to claim 1, wherein the profile is a decorative profile in the shape of a chamfer.

5. The method according to claim 4, wherein the melting of the WPC material is implemented by heating the milling head used in the process for the profiling of the at least one edge of the plate-shaped carrier to a temperature greater than or equal to a melting temperature of the WPC material and less than a decomposition temperature of the WPC material.

6. The method according to claim 1, wherein the melting of the WPC material is implemented by heating the milling head used in the process for the profiling of the at least one edge of the plate-shaped carrier to a temperature greater than or equal to a melting temperature of the WPC material and less than a decomposition temperature of the WPC material.

7. The method according to claim 6, wherein the surface of the profile after the thermal treatment comprises a closed layer of plastic.

8. The method according to claim 6, wherein the surface of the profile after the thermal treatment comprises a closed layer of plastic and wood fibers disposed on the surface surrounded by plastic.

9. The method according to claim 6, wherein the milling head is temperature controlled to a maximum temperature of 30° C. above the melting temperature of the WPC material.

10. The method according to claim 9, wherein the temperature of the milling head is monitored contact-free.

11. The method according to claim 9, wherein at least the profiled region of the edge of the plate-shaped carrier is cooled down to a temperature below the melting point after the melting of the WPC material and sealing of the surface.

12. The method according to claim 11, wherein the cooling is carried out within a period of ≤60 s.

13. The method according to claim 11, comprising applying a decor to the carrier by a direct printing process subsequently to the forming the profile in the edge of the plate-shaped carrier.

14. The method according to claim 1, comprising applying a decor to the carrier by a direct printing process subsequently to the providing the plate-shaped carrier.

15. The method according to claim 14, comprising a step for applying a printing base prior to the step of applying a decor.

16. The method according to claim 1, comprising applying a decor to the carrier by a direct printing process subsequently to the forming the profile in the edge of the plate-shaped carrier.

17. The method according to claim 1 comprising:
the providing the carrier;
the forming the profile;
and the thermal treatment;
wherein the thermal treatment is performed during the forming the profile by heating the milling head used in the forming the profile; and
applying a decor to the carrier by a printing process performed after the forming the profile.

18. The method according to claim 17 further comprising applying a wear layer over the decor.

19. The method according to claim 1, wherein the WPC material comprises wood and polymer in a ratio between 40/60 and 70/30.

20. The method according to claim 1, wherein 3 the WPC material comprises wood in a proportion between 45 wt % and 55 wt %.

* * * * *